UNITED STATES PATENT OFFICE.

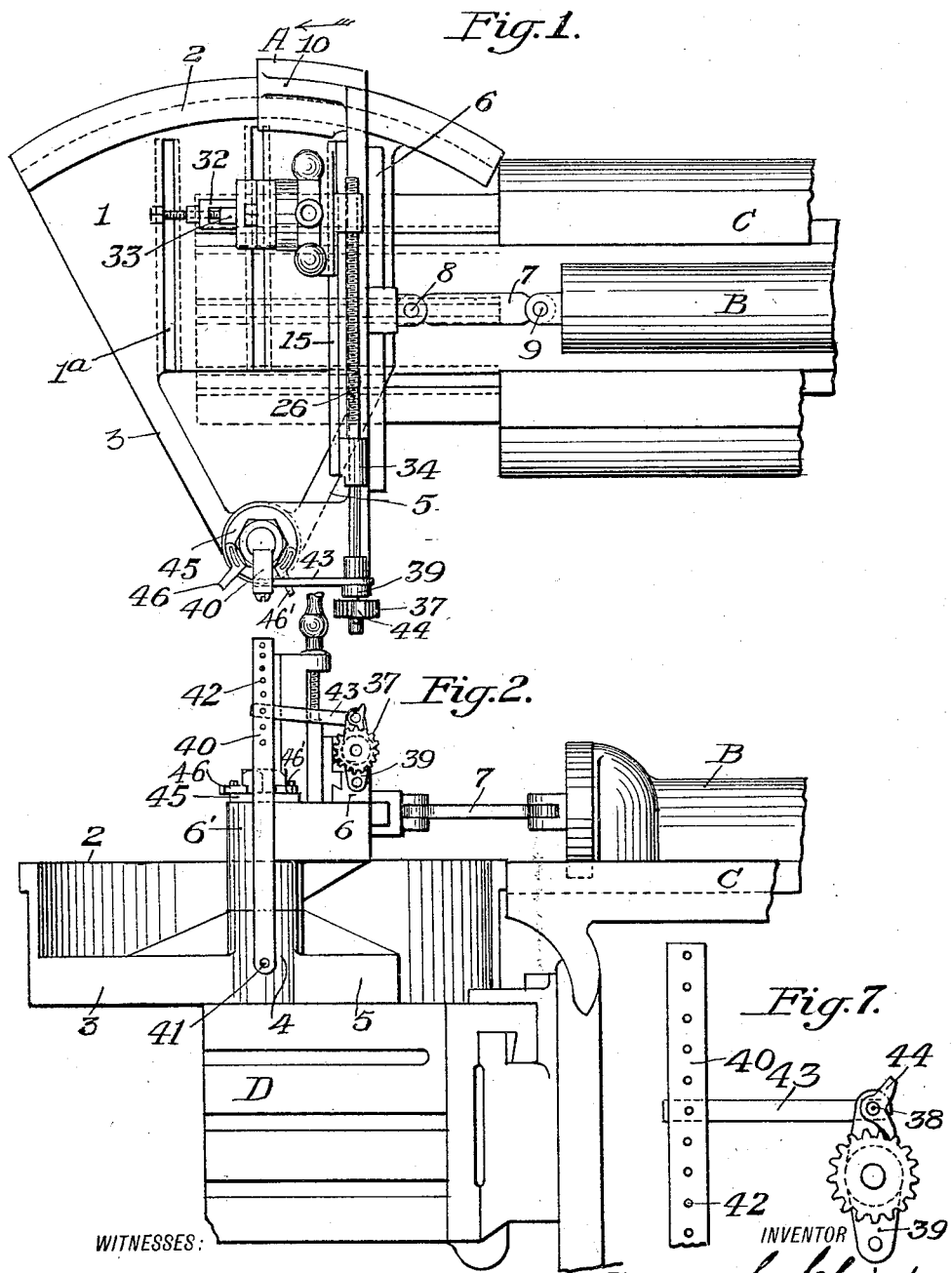

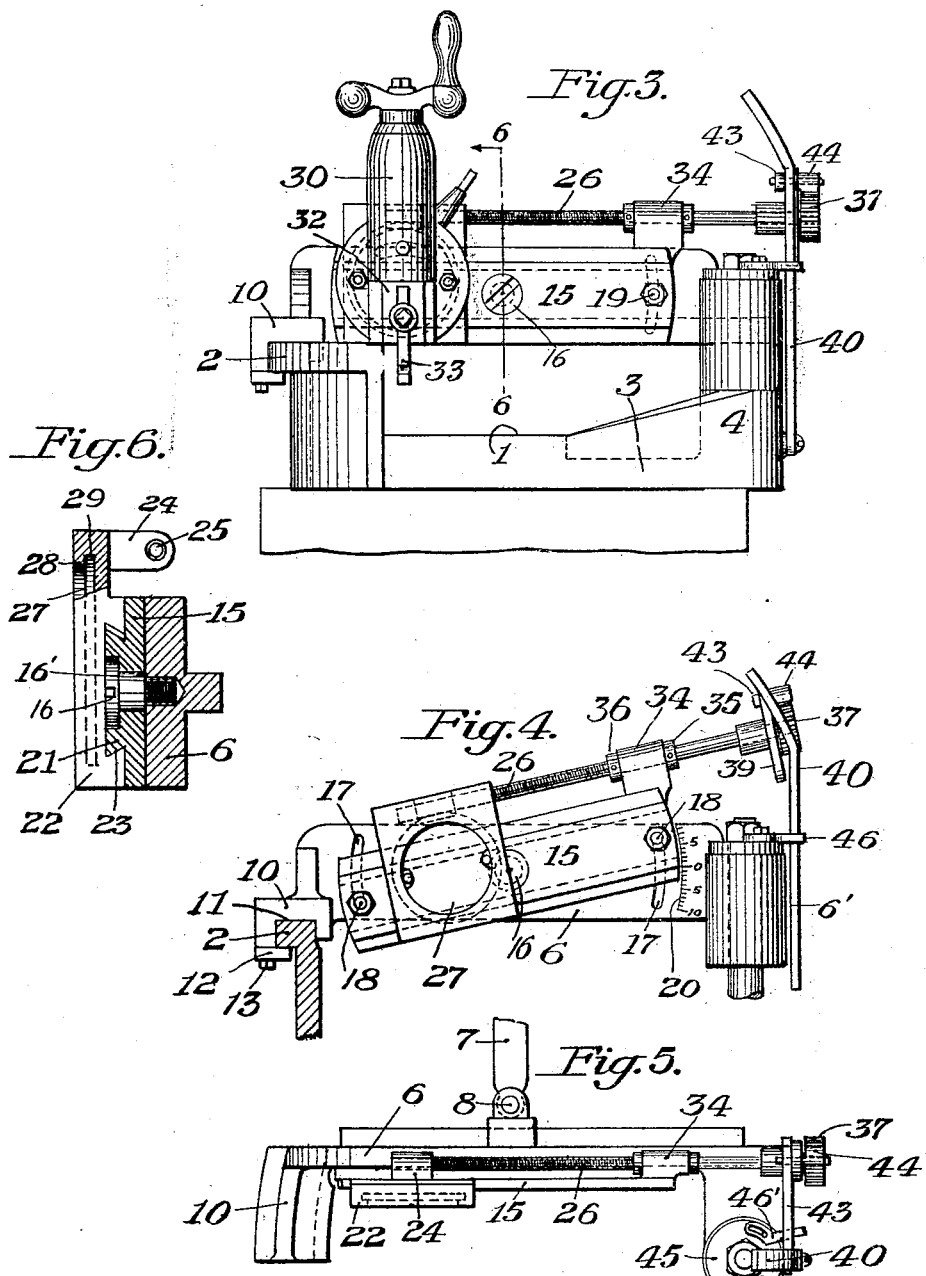

AUGUST C. CHRIST, OF PITTSBURGH, PENNSYLVANIA, ASSIGNOR OF ONE-HALF TO JOHN JACOB KINZER, OF WILDWOOD, PENNSYLVANIA.

ATTACHMENT FOR MACHINE-TOOLS.

1,198,892.

Specification of Letters Patent.  Patented Sept. 19, 1916.

Application filed January 15, 1915. Serial No. 2,376.

*To all whom it may concern:*

Be it known that I, AUGUST C. CHRIST, a citizen of the United States, and a resident of Pittsburgh, in the county of Allegheny and State of Pennsylvania, have invented a new and useful Improvement in Attachments for Machine-Tools; and I do hereby declare the following to be a full, clear, and exact description thereof.

My invention relates to machine tools and particularly to equipments for cutting curved and irregular surfaces wherein the entire forward travel of the cutting tool is utilized for bringing the work to its finished condition.

The object of my invention is to provide a cheap, simple and efficient attachment for machine tools which can be quickly and conveniently mounted upon or attached to a machine tool, such as planers, drill presses, etc., and one which when so mounted and operated will cut along curved surfaces of any desired radii, and can be set to cut any desired taper.

Another object of my invention is to provide an equipment for machine tools in which the cutting tool swings from a fixed center and is so arranged as to cut any curved surface of any radius without changing the center from which the tool swings.

Still another object of my invention is to provide an equipment for machine tools embodying the above mentioned characteristic and in addition thereto provided with an automatic feed device for automatically feeding the tool on to the work.

The above and additional objects are accomplished by such means as are illustrated in the accompanying drawings, described in the following specification and then more particularly pointed out in the claims which are appended hereto and form a part of this application.

With refereance to the drawings, wherein I have illustrated the preferred embodiment of my invention as it is reduced to practice, and throughout the several views of which similar reference numerals designate corresponding parts: Figure 1 is a top plan view of the device showing the same in position for operation; Fig. 2 is an end view of the same looking from the lower end of Fig. 1; Fig. 3 is a front view of the same showing the cutting tool ready for operation. Fig. 4 is a front view of the guide plate which carries the head and shows the automatic feed device mounted thereon. Fig. 5 is a top plan view of the same showing the link member which operates the same. Fig. 6 is a cross sectional view of the swinging beam with the guide plate and feed plate in position. Fig. 7 is a top plan view of the table showing the swinging beam so arranged as to cut curved surfaces having greater radius than the radius upon which the cutting tool swings.

Like symbols of reference herein indicate like parts in each of the figures of the drawing.

My improved device for machine tools is adapted both as an attachment for old machines now in use or as a separate machine. In the drawings I have shown the device as applied to an ordinary planer, and I have omitted all the well known parts of the planer except a portion of the ram thereof.

The device A is operated by the ram B which operates in the usual slide C of the machine tool as shown in Figs. 1 and 2 of the drawings, and the table 1 of the device rests on the table D of the machine as shown in Figs. 1, 2 and 3. The bottom of the table 1 is provided with the necessary slots or other means for connecting the same to the table D of the machine tool, while the top face of the said table 1 is provided with the slots 1ª for securing the work thereon. The table 1 has a fixed guiding shoulder 2 at one end of the same and formed integrally therewith, while the front 3 of said table tapers off to a pivot pad 4, and the rear 5 of said table also tapers off irregularly to said pad.

The swinging beam 6 of the device A is connected to the ram B of the machine tool by means of a link 7 which is pivotally connected with the said beam and with the said ram at the pivotal points 8 and 9 respectively, as shown in Figs. 1 and 2. This swinging beam 6 has a hub 6′ which is adapted to rest upon and be pivotally connected to the pivot pad 4 on the table 1 of the device. This swinging beam is spaced a sufficient distance above the table to provide the necessary clearance of the arm over the work to be acted upon by the cutting tool. The outer end of the beam is provided with a bearing portion 10 which rests upon the fixed curved guide 2 and is slidable thereon as later explained.

The guide 2 of the table 1 is adapted to extend into a slot 11 on the bearing portion 10 and the said slot is curved on a radius equal to the distance between the center of the pivot pad 4 and the curved slot 11, while the engagement between said guide and said slot will take care of any strain toward or away from the pivot pad 4. The bearing portion 10 is also provided with a plate 12 which is secured thereto by any suitable means such as the bolt 13, and acts to securely hold the terminal of the beam 6 against upward movement.

The swinging beam 6 is provided with a slide-base 15 which is pivotally connected to the beam at its center by means of the screw 16, the shank of which is provided with the annular shoulder 16' which prevents the screw from being threaded such a distance into the member 6 as would cause the member 15 to bind thereagainst.

Adjacent to the ends of the beam 6 are formed curved slots 17 which receive bolts 18 carried by the slide-base 15. The nuts 19 of the bolts can be screwed down tightly against the beam in order to secure the tool carrying plate at the desired angle. If desired the beam 6 may be provided with a scale 20 adjacent to one end of the slide-base 15 in order to permit the operator to set the plate at any desired angle without the necessity of measuring for each adjustment.

The slide-base 15 is provided with a dovetail 21 extending the full length of the same and a feed plate 22 is slidably connected to the member 15 by the insertion of the member 21 in a dove-tail slot 23. The upper part of the feed plate is provided with a rearwardly extending lug 24 having a threaded hole 25 which receives the feed screw 26 as later explained. The front of the feed plate 22 is provided with a circular recess 27 which is defined by an annular flange 28 which is produced by the annular groove 29. This groove receives heads of the bolts which are employed in holding the head 30 in position. This head 30 is of the regular approved type now universally used on machines of this character and is provided with the usual tool post 32 for holding the cutting tool 33.

The slide-base 15 is provided at its inner end with a bearing portion 34 through which the feed screw 26 extends. This screw is freely rotatable within the bearing, and is held against longitudinal movement therethrough by the collars 35 and 36 on the opposite sides of the bearing. The feed shaft 26 which is adapted to be automatically actuated is provided at one end with a pinion 37 which is keyed to the screw. A double-ended oscillatory arm 39 is loosely mounted on the shaft and is adapted to be freely swung independently of the movement of the screw.

The inner end of the table 1 is provided with an upwardly extending lever 40 which is pivoted at its lower end to the table as at 41 and is provided with a series of holes 42 in any of which may be inserted a pin for securing the connecting link 43. This connecting link 43 is adapted to be attached at its other end to the oscillatory arm 39. A double-ended pawl member 44 is loosely mounted at the upper end of said oscillatory arm on the pin 38, and is adapted to engage the pinion 37 to advance the same in either direction.

On the top of the hub 6' of the swinging beam 6 is securely fixed a washer 45, and a pair of trip or stop members 46 and 46' are adjustably mounted on said washer. These stops are provided with arcuate slots which receive set screws by which the stops may be held in adjusted position.

The device operates in the following manner:—The work is first clamped upon the table by clamps of a suitable character, being disposed so that the finishing stroke of the tool will be made in an arc the radius of which is equal to the radius of the desired finished face of the work. The motor or other power source employed in connection with the planer is started and connected, by the throwing of a clutch or other means, to the ram so as to cause the reciprocation of this member. The hand wheel and handle of the head 30 having been previously manipulated to move the tool 33 into engagement with work it is obvious that the reciprocation of the ram will cause the beam 6 and consequently the tool 33 to oscillate in an arc. It is of course necessary after each forward stroke of the tool and during the return movement thereof to feed the tool toward the pivotal point or hub of the beam so that the tool will, at the commencement of each forward stroke take a fresh bite into the work. This feeding of the tool is accomplished automatically by the member 40. The stops 46 and 46' are so disposed that the member 40 may swing only during the first stage of the forward movement of the beam 6 in the direction of the arrow (Fig. 1). Since the outer end of screw 26 is located a greater distance from the pivotal point of the beam 6 than the arm 40 it is obvious that the member 26 travels a greater distance during one stroke of the beam than the member 40. Consequently during the last phase of the forward movement of the beam the member 40 having been drawn to the right (Fig. 2) abuts the stop 46' and is practically stationary with respect to the hub 6' even though it is still swinging on its pivotal point 41. During the last part of the forward movement of the beam the terminal of the member 26 is moving away from the member 40. Consequently since the link 43 is non-extensible and is attached to the member 40 the upper end of the arm 39 will be drawn over toward the hub 6'. The swinging of the arm 39 during the last part of the forward stroke of the beam (6) causes the end of the pawl 44 to be moved freely over the pinion 37 and engaged with a tooth thereof which is nearer the hub 6'. It will now be seen that upon the return stroke of the beam the member 40 will be moved back into engagement with the stop 46 before the beam has come to its extreme rearward position. Thus during the last part of the return stroke of the beam the pinion 37 will be turned through an arc equal to the distance separating the several teeth thereof. Since the pinion is keyed to the screw shaft 26 this member will be given a partial revolution which will draw the tool a small distance nearer the hub of the beam and will cause the tool to take a fresh bite in the piece of work at the start of the forward stroke.

Obviously the tool may be fed outwardly step by step by attaching the link 43 to the lower end of the arm 39 and mounting the pawl 44 on the pin employed in connecting these two members.

When it is desired to cut a bevel on the pieced work it is only necessary to loosen the nuts 19 of the bolts 18 and swing the member 15 on its central axis 16. The tool may be accurately set to cut the bevel at any desired pitch by reading a suitable indicator mark on the terminal of the member 15 in connection with the scale 20.

The tool should of course always extend in a vertical plane at right angles to the bed plate I. When therefore the slide-base 15 is swung to extend at an angle to the horizontal plane the tool is properly adjusted by loosening the bolts 30, and turning the tool holding head 31 in the slide-base 15.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:

1. A device for planing curved surfaces, comprising a support, an arm pivoted to said support, a slide-base carried by said arm, driving means associated with said slide-base, said slide-base and driving means being angularly adjustable with respect to said arm, and a planing tool slidably associated with said slide-base and having a driving connection with said driving means, whereby said driving means effects a sliding movement of said planing tool with respect to said slide-base.

2. A planing device comprising a work-support, a horizontal arm pivoted to said support, a member mounted on said arm so as to be angularly adjustable with relation thereto, a tool carrier slidably mounted on said member, means for effecting a reciprocating movement of said arm, and means for effecting a step by step sliding movement of said tool carrier along the arm when said arm is reciprocated.

3. A planing device comprising a work-support, a horizontal arm pivoted to said support, a member mounted on said arm so as to be angularly adjustable in relation thereto, a carrier slidably mounted on said member, and a tool holder mounted on said carrier and angularly adjustable with relation thereto.

4. In a planing device, a work-support, a horizontal arm pivoted to said support, a member mounted on said arm and angularly adjustable with relation thereto, a carrier slidably mounted on said member, a tool holder mounted on said carrier and angularly adjustable with respect thereto, and means for effecting a step by step movement of said carrier along the arm when said arm is reciprocated.

5. A planing device comprising a work-support, a horizontal arm pivoted to said support, a tool holder mounted to slide longitudinally with relation to said arm, step by step feeding means for moving the tool holder along the arm when said arm is reciprocated, means for effecting a reciprocating movement of said arm, and means pivoted to said support, and operated by said arm, for actuating said feeding means.

6. A device for planing curved surfaces, comprising a support, an arm pivoted to said support, a slide-base carried by said arm, driving means associated with said slide-base, said slide-base and driving means being angularly adjustable with respect to said arm, a planing tool slidably associated with said slide-base and having a driving connection with said driving means, whereby said driving means effects a sliding movement of said planing tool with respect to said slide-base, means for oscillating said arm about its pivot, and means for actuating said driving means at each oscillation of said arm.

7. A machine for planing curved surfaces, comprising a pivoted arm, a slide-base carried by said arm and angularly adjustable with respect thereto, a tool carrier slidably mounted on said slide-base, means for effecting a sliding movement of said tool carrier on said slide-base, said last named means being operable at all angles of said slide-base with respect to said arm, and means for effecting an oscillating movement of said arm.

In testimony whereof, I the said AUGUST C. CHRIST, have hereunto set my hand.

AUGUST C. CHRIST.

Witnesses:
J. N. COOKE,
T. B. HUMPHRIES.

Copies of this patent may be obtained for five cents each, by addressing the "Commissioner of Patents, Washington, D. C."